United States Patent
Kim et al.

(10) Patent No.: US 7,066,709 B2
(45) Date of Patent: Jun. 27, 2006

(54) WIND DRIVEN POWER GENERATING SYSTEM

(76) Inventors: Dong Yong Kim, Division of Electronics and Information Engineering, Chonbuk National University, 664-14 Deokjin-dong, Deokjin-ku, Chonju-si, Chonrabuk-do (KR); Yeong Min Kim, #104-905 Shinil Gangnyeon APT., Samcheon-dong, Wansan-ku, Chonju-si, Chonrabuk-do (KR)

( * ) Notice: Subject to any disclaimer, the term of this patent is extended or adjusted under 35 U.S.C. 154(b) by 72 days.

(21) Appl. No.: 10/895,198

(22) Filed: Jul. 19, 2004

(65) Prior Publication Data

US 2005/0196281 A1    Sep. 8, 2005

(51) Int. Cl.
*F04D 7/04* (2006.01)
*F01D 7/02* (2006.01)

(52) U.S. Cl. ......................... 415/4.3; 415/4.5; 415/123; 415/124.2; 415/130; 415/908; 416/111; 416/132 B

(58) Field of Classification Search ............... 415/4.5, 415/4.3, 123, 122.2, 130, 908, 124.2; 416/11.1, 416/132 B, 135, 136, 13.7, 111, 137; 290/44, 290/55

See application file for complete search history.

(56) References Cited

U.S. PATENT DOCUMENTS

| | | | | |
|---|---|---|---|---|
| 857,376 A | * | 6/1907 | Axlstrom | 416/137 |
| 1,266,518 A | * | 5/1918 | Mulrony | 416/124 |
| 1,533,467 A | * | 4/1925 | Sargent | 416/137 |
| 2,516,576 A | * | 7/1950 | Jacobs | 416/135 |
| 4,257,740 A | * | 3/1981 | Duez | 416/137 |
| 4,310,284 A | * | 1/1982 | Randolph | 416/132 B |
| 4,316,698 A | * | 2/1982 | Bertoia | 416/11 |
| 4,349,315 A | * | 9/1982 | Ducker | 416/1 |
| 4,613,763 A | * | 9/1986 | Swansen | 290/44 |
| 5,118,255 A | * | 6/1992 | Moreno | 416/117 |
| 5,178,518 A | * | 1/1993 | Carter, Sr. | 416/11 |

\* cited by examiner

*Primary Examiner*—Igor Kershteyn
(74) *Attorney, Agent, or Firm*—JHK Law; Joseph Hyosuk Kim

(57) ABSTRACT

The present invention discloses a wind driven power generator. The wind driven power generating system comprises: a) an aerodynamic unit rotatably mounted at the top of a tower having a certain height; b) a plurality of rudders for aligning the aerodynamic unit with the direction of wind, the rudders being radially formed on the outer surface of the aerodynamic unit; c) a horizontal shaft rotatably and horizontally mounted in the aerodynamic unit, wherein one end of the outwardly from the backend of the aerodynamic unit and the other end of the horizontal shaft remains inside of the aerodynamic unit and is provided with a first bevel gear; d) a blade attached to the rear end of the horizontal shaft, wherein the blade is rotated by the wind and thus rotates the horizontal shaft; e) blade variation means disposed at the rear portion of the aerodynamic unit for slanting the blade backwards and forwards, depending on the wind pressure; f) a power generator installed inside the tower; and g) a vertical shaft for transmitting the rotating power of the horizontal shaft to the power generator, wherein one end of the vertical shaft is provided with a second bevel gear, which is engaged with the first bevel gear, and the other end thereof is connected to a rotor shaft of the power generator.

4 Claims, 5 Drawing Sheets

WIND DRIVEN POWER GENERATING SYSTEM

BACKGROUND OF THE INVENTION

1. Field of the Invention

The present invention relates to a wind driven power generating system of single rotor type in which a horizontal and vertical shafts are combined. Specifically, the invention relates to a wind driven power generating system in which, under blowing of strong wind, the rotating blade is automatically and variably slanted backwards by means of a spring force without any pitch control while directing against the wind, thereby protecting the system and continuing the generation of electricity.

2. Background of the Related Art

In general, a wind driven power generating system generates electricity by using a blade driven by the wind power. That is, the kinetic energy due to rotation of the blade is converted into electrical energy, which is supplied to individual users. The conventional wind driven power generating system, according to the orientation of shafts, is categorized into a horizontal shaft system having a propeller, a vertical shaft system such as a Gyro-mill type and a Darius type, and a combination type system of vertical-horizontal shafts. As compared with nuclear, hydraulic, thermal power generation system, the wind driven power generating system is very economical in terms of the construction cost and area, and can avoid environmental contamination.

The conventional wind driven power generator is composed of a main body rotatably installed on the top of a tower, a blade mounted at the front end of the main body and rotated by the wind power, a gearbox such as an accelerator for accelerating the rotating power of the blade, and a power generator for converting the accelerated rotating power into electrical energy, and the like.

For the conventional wind driven power generator having the above-described construction, when the blade is rotated by the wind, the rotating power is accelerated through the gearbox. Then, the power generator produces electrical energy using the accelerated rotating power and the produced electrical energy may be either stored in an electrical energy storage unit or supplied directly to the users.

In the horizontal shaft type described above, the rotation torque transmitting path is rather short and thus provides an advantage of high efficiency of transmission. However, the main body with the power generator and the like equipped therein is heavy to the extent that it disturbs an easy yaw operation depending on the wind direction. Furthermore, after the body has been rotated by a certain number of times, the system operation must be intermitted in order to restore the twisted electric cable into the original state.

In addition, since the power generator is placed inside the main body, it cannot readily be cooled and maintained/repaired. Also, at emergency such as a strong wind, the system operation must be interrupted by means of the pitch control of blade in order to protect the system from overload of the power generator, and accordingly the generation of electricity is inevitably discontinued.

In the dual rotor type (the combination type of horizontal and vertical shafts), the wind power passing through the center portion of a main blade can be utilized by an auxiliary blade to produce a rotation torque, and thus can use the wind power efficiently. However, the opposite rotating directions of the main and auxiliary blades make it difficult to fabricate the blades, and a precision pitch control must be carried out with respect to each blade in order to uniformly combine the torque of the main and auxiliary blades, but practically a perfect pitch control cannot be easily achieved.

In the dual rotor type (the combination type of horizontal and vertical shafts), the wind power passing the center portion of a main blade can be utilized by an auxiliary blade to produce a rotation torque, and thus can use the wind power efficiently. However, the opposite rotating directions of the main and auxiliary blades make it difficult to fabricate the blades, and a precision pitch control must be carried out with respect to each blade in order to uniformly combine the torque of the main and auxiliary blades, but practically a perfect pitch control cannot be easily achieved.

Furthermore, similar to the horizontal type generating system, the manufacturing cost is rather high, and at emergency such as a strong wind the generation of electricity cannot be continued.

SUMMARY OF THE INVENTION

Therefore, the present invention has been made in view of the above problems occurring in the prior art, and it is an object of the present invention to provide a wind driven power generating system in which, during the blowing of a strong wind, the rotating blade is automatically and variably slanted backwards by means of a spring force without any pitch control while directing against the wind, thereby protecting the system from overload of the power generator and continuing the generation of electricity.

To accomplish the above objects, according to the present invention, there is provided a wind driven power generating system of single-rotor type in which a horizontal and vertical shafts are combined. The wind driven power generating system includes: a) an aerodynamic unit rotatably mounted at the top of a tower having a certain height; b) a plurality of rudders for aligning the aerodynamic unit with the direction of wind, the rudders being radially formed on the outer surface of the aerodynamic unit; c) a horizontal shaft rotatably and horizontally mounted in the aerodynamic unit, wherein one end of the outwardly from the backend of the aerodynamic unit and the other end of the horizontal shaft remains inside of the aerodynamic unit and is provided with a first bevel gear; d) a blade attached to the rear end of the horizontal shaft, wherein the blade is rotated by the wind and thus rotates the horizontal shaft; e) blade variation means disposed at the rear portion of the aerodynamic unit for slanting the blade backwards and forwards, depending on the wind pressure; f) a power generator installed inside the tower; and g) a vertical shaft for transmitting the rotating power of the horizontal shaft to the power generator, wherein one end of the vertical shaft is provided with a second bevel gear, which is engaged with the first bevel gear, and the other end thereof is connected to a rotor shaft of the power generator.

According to the present invention, in response to a high wind pressure such as a strong wind or a sudden gust of wind, the blade variation unit is automatically operated such that the blade is variably slanted backwards and forwards to accommodate the high wind pressure without any additional pitch control. Therefore, the rotating power transmitted to the power generator can be controlled, thereby avoiding the overload of the generator, thus protecting the whole generating system, and also allowing for a continual generation of electricity even during a strong wind or a sudden gust of wind.

In addition, the power generator is placed in the tower and operably connected, via the vertical shaft, the bevel gears and the like, to the rotating blade mounted in the aerodynamic unit. Therefore, it allows for a convenient maintenance and an easy installation of electric wires, a stable yaw operation at a low speed of wind due to the lightness of the aerodynamic unit, and prevention of wire twisting during the rotation of the aerodynamic unit.

Furthermore, the simplified structure of the wind driven power generating system of the invention makes it possible to reduce the manufacturing cost thereof.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now made in detail to the preferred embodiment of the present invention with reference to the attached drawings. It is noted that details on the well-known components and their functions will not be described.

Figure 1:
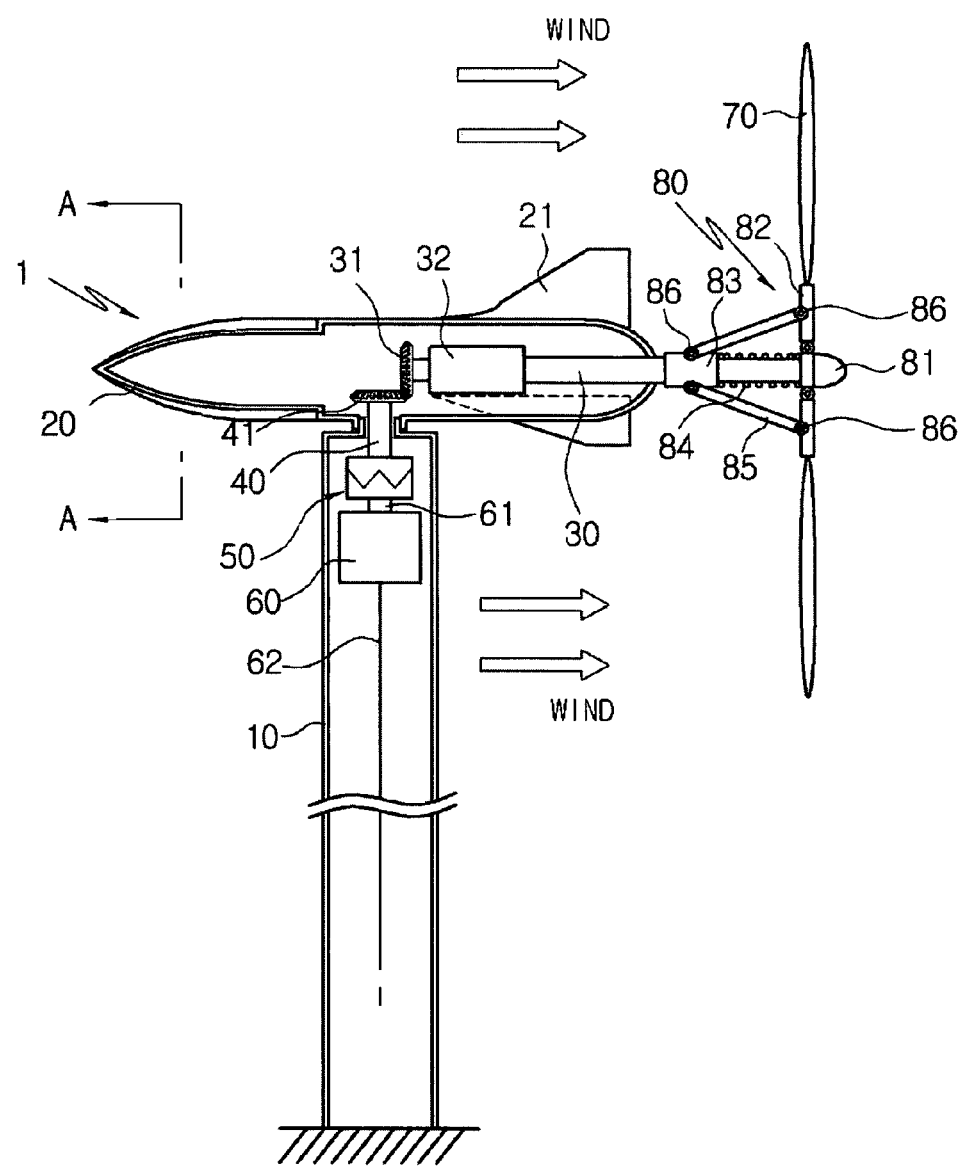
FIG. 1 illustrates a cross sectional view of a wind driven power generating system according to one embodiment of the invention.
Figure 2:
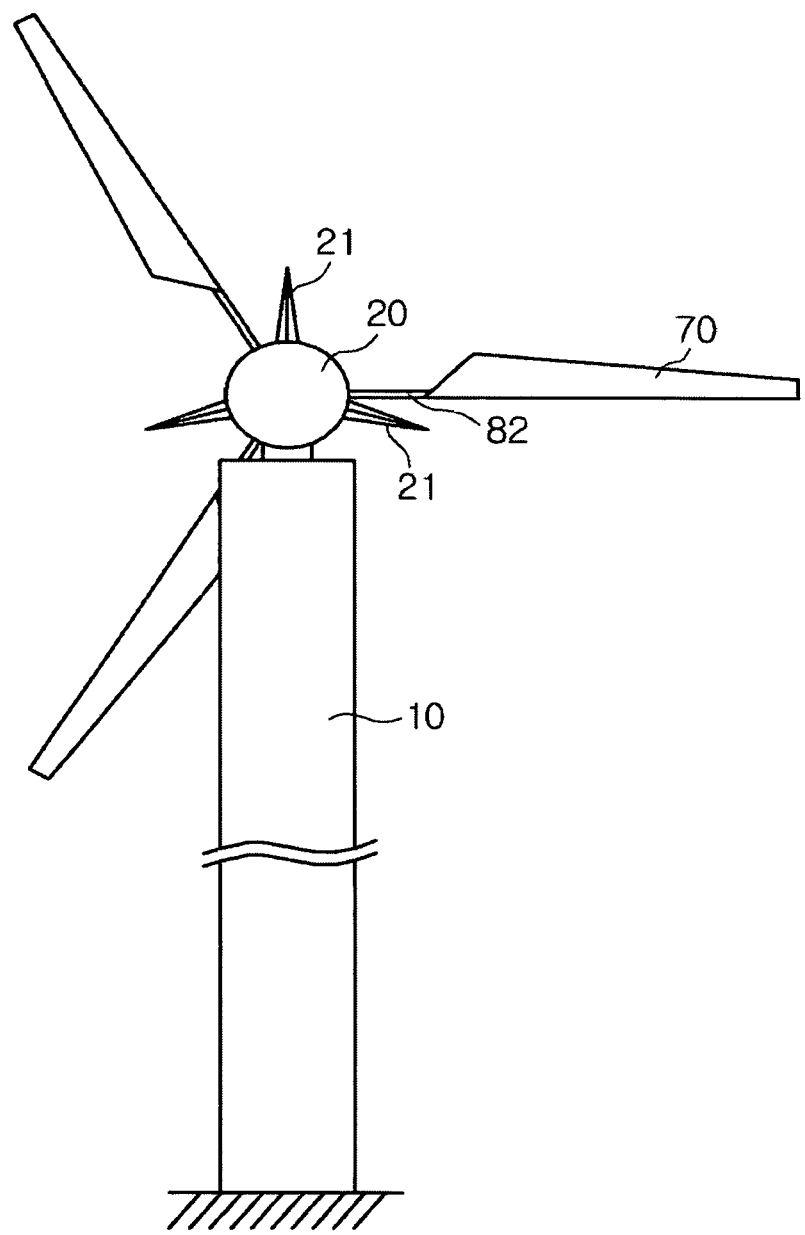
FIG. 2 is a front view of the wind driven power generating system in FIG. 1.

FIG. 1 illustrates a cross sectional view of a wind driven power generating according to one embodiment of the invention, in which the wind driven power generating system is generally denoted at reference numeral 1. FIG. 2 is a front view of the wind driven power generating system in FIG. 1, and FIG. 3 illustrates details of a blade variation device and its operation according to one embodiment of the invention.

Figure 3:
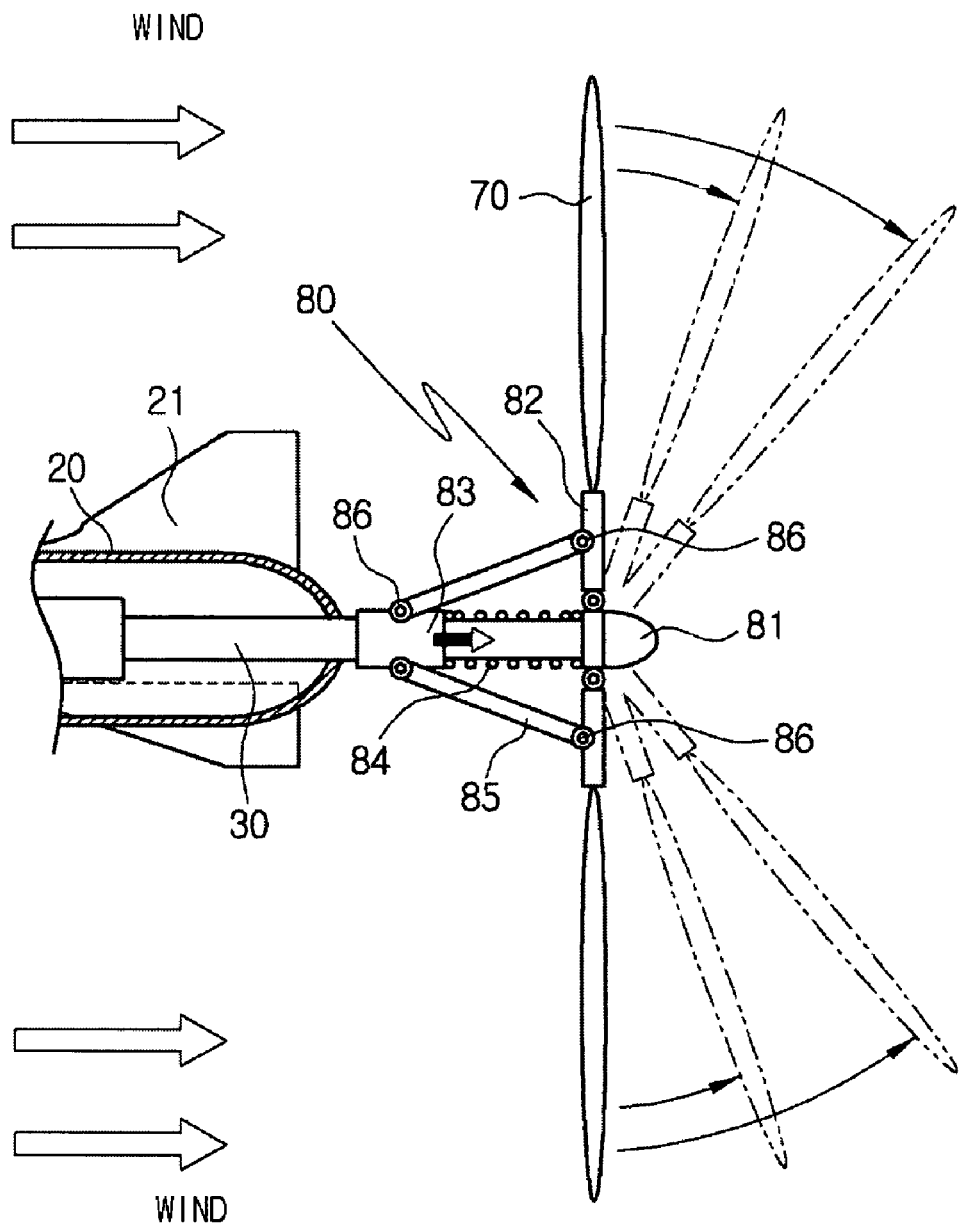
FIG. 3 illustrates details of a blade variation device and its operation according to one embodiment of the invention.

Referring to FIGS. 1 to 3, the wind driven power generating system 1 includes a tower 10 having a certain height and secured to the ground, and an aerodynamic unit 20 rotatably mounted atop the tower 10.

The inside of the aerodynamic unit 20 is preferred to be hollow to make it light.

A rudder 21 is radially formed on the outer surface of the aerodynamic unit 20. In this embodiment, three rudders are provided.

Preferably, the rudder 21 is disposed in the rear portion of the aerodynamic unit 20, relative to the tower 10.

Therefore, the aerodynamic unit 20 can be always aligned with the wind blowing from the front by means of the rudder 21, without any supplemental equipment, thereby assisting in a stability and freedom of yaw operation.

A horizontal shaft 30 is rotatably mounted inside the rear portion of the aerodynamic unit 20.

One portion of the horizontal shaft 30 is projected outwardly from the rear end of the aerodynamic unit 20. The other portion thereof is held inside the aerodynamic unit 20, and on its end is provided a first bevel gear 31.

On the projected end-portion of the horizontal shaft 30 is mounted a blade 79 combined with a blade variation unit 80, by which the blade 79 can be variably slanted forwards and backwards, depending to the wind pressure. Details on the blade variation unit 80 will be hereafter described, in conjunction with FIG. 3.

Therefore, the blade 70 is positioned backwards relative to the aerodynamic unit 20, and rotates the horizontal shaft 30 by rotating itself by the wind.

Conventionally, the blade has been mounted on the front side of the aerodynamic unit. In the present invention, however, the blade 70 is provided in the back side of the aerodynamic unit 20 for the purpose of a freedom of yaw operation of the aerodynamic unit 20 and a variable operation of the blade 70 depending on the wind pressure, i.e., the wind speed.

That is, since the blade 70 is spaced apart from the rear side of the aerodynamic unit 20 by a certain distance, the aerodynamic unit 20 tends to be aligned with the wind direction by means of the rotating moment of the blade 70. Therefore, this arrangement assists the rudder 21 to be able to obtain a greater stability and freedom of yaw operation.

As illustrated in detail in FIG. 3, the blade variation unit 80 includes a hub 81 mounted to the rear end of the horizontal shaft 30, a plurality of first link bars 82 pivotably provided to the outer peripheral surface of the hub 81, a sliding sleeve 83 slidably mounted on the horizontal shaft 30, a spring 84 fit around the horizontal shaft 30 between the hub 81 and the sliding sleeve 83, and a plurality of second link bars, each of which connects the sliding sleeve 83 with the corresponding first link bar 82. One end of each first link bar 82 is connected to the root of the blade 70 and the other end thereof is pivotably connected to the outer periphery of the hub 81 by means of a pin 86. Due to the spring, the sliding sleeve 83 is biased away from the hub 81. One end of the second link bar 85 is pivotably connected to the sliding sleeve 83 at a pin 86, and the other end thereof is pivotably connected to the first link bar 82 at a pin 86, the position of which is spaced apart from the hub 81.

Furthermore, the tension of the spring 84 may be adjusted in order to control the variable operation of the blade 70, depending on the wind speed or pressure.

Preferably, the blade variation unit 80 of the invention is designed such that, below a certain wind pressure, the blade 70 remains substantially perpendicular to the horizontal shaft 30 to achieve the maximum efficiency, and above a certain wind pressure, for example, for a strong wind, the blade can be variably slanted backwards correspondingly to the increase in the wind pressure.

Therefore, due to a strong wind, if the blade 70 is slanted backwards, the rotation of the blade 70 decreases by less effect of the wind and the rotating power of the horizontal shaft 30 is reduced correspondingly. Accordingly, the overload of a power generator 60 (which will be hereinafter described) can be prevented, thereby protecting the generating system and allowing for a continual generation of electric power.

Inside the upper portion of the tower 10 is provided a power generator 60, which generates electricity by using rotating power transferred thereto from the blade 70.

In addition, an electric wire 62 is connected to the power generator 60, which transmits the electric power to an electrical energy storage unit or a power transmission cable on the ground (not shown).

A vertical shaft 40 running from the inside of the aerodynamic unit 20 to the inside of the tower 10 is mounted in order for the rotating power of the horizontal shaft 30 to be transmitted to the power generator 60.

To one end of the vertical shaft 40 is coupled a second bevel gear 41 which is engaged with the first bevel gear coupled to the horizontal shaft 30. The other end of the vertical shaft 40 is connected to a rotor shaft 61 of the power generator 60.

Furthermore, a coupling unit 50 is provided between the vertical shaft 40 and the rotor shaft 61 of the power generator 60 such that the power generator 60 can be detachably engaged with the vertical shaft 40 for the purpose of convenient maintenance.

On the horizontal shaft 30 is installed a gearbox 32, where the rotating power of the horizontal shaft 30 is accelerated and then transmitted to the power generator 60 via the vertical shaft 40.

The gearbox 32 including an epicycle gear, a ring gear or the like, is well known to those skilled in the art and thus further details on the gear box will not be described.

For example, the gearbox 32 functions to accelerate the rotating power of the horizontal shaft 30 so as to generate electricity during a weak wind of lower speed. Also, it may provide for appropriate acceleration, depending on the type of power generator.

On the other hand, a spiral bevel gear is preferably used as the first and second bevel gears 31 and 41 in order to reduce noises.

The operation of the wind driven power generating system according to the invention will be hereafter described in greater detail.

First, in response to a wind pressure, the aerodynamic unit 20 is automatically aligned with the direction of the wind by means of yaw operation due to the rudder 21, which is provided in the rear portion of the aerodynamic unit 20, relative to the rotating center thereof. At this point, the blade 70 also rotates by the wind and the rotating moment of the blade assists in the yaw operation of the aerodynamic unit 20 since the blade 70 is placed backward, relative to the rotating center of the aerodynamic unit 20.

The horizontal shaft 30 rotates by the rotation of the blade 70. At this time, the rotating power of the horizontal shaft 30 is transmitted to the power generator 40 via the gearbox, where the rotating power is accelerated for efficient generation of electricity.

The accelerated rotation is transmitted, in sequence, to the first bevel gear 31, the second bevel gear 41, the vertical shaft 40, the coupling unit 50, and the rotor shaft 61 of the power generator 60.

When the rotor shaft rotates, a rotor (not shown) installed inside the power generator 60 rotates with a high speed to produce electricity.

The electric power produced by the power generator 60 is transmitted to a storage unit or a power cable on the ground via the electric wire 62.

On the other hand, during a strong wind, a high wind pressure above a certain level is exerted to the blade 70 so that the rotation of the blade 70 is excessively increased. At this time, the blade 70 accommodates the high wind pressure by slanting itself backwards. Specifically, when the blade 70 starts to be slanted backwards i.e., pivoted backwards together with the first link bar 82, the sliding sleeve 83 is moved backward along the horizontal shaft 30 by means of the second link bar 85 pivotably connected to the horizontal shaft 30 and the first link bar 82, while compressing the spring 84 inserted between the hub 81 and the sliding sleeve 83.

The slanting or pivoting movement of the blade 70 stops when the wind pressure balances the compression force of the spring 84. At this point, the blade 70 slanted backwards at a certain angle is less affected by the high wind pressure rather than its initial vertical state, so that the rotating speed is reduced. Consequently, the rotating power transmitted to the power generator 60 is alleviated, thereby preventing overload of the power generator 60 and allowing for a continual generation of electricity.

As the strong wind dies away, the sliding sleeve 83 moves forwards along the horizontal shaft 30 due to the restoring force of the spring 84 and thus the slanted blade 70 returns to its initial position by means of operation of the second link bar 85 pivotably connected to the sliding sleeve 83 and the blade (i.e., the first link bar 82).

In this way, the blade 70 can be variably and automatically pivoted backwards and forwards in response to the wind pressure and, therefore, the rotating power transmitted to the power generator 60 can be controlled, thereby protecting the whole generating system through prevention of overload of the power generator 60, and also being able to continue the generation of electricity even at emergency such as a strong wind or a sudden gust of wind.

In other words, the blade variation unit 80 of the invention prevents the blade 70 and the whole system from a sudden gust of wind by alleviating such sudden impact therefrom.

Figure 4:
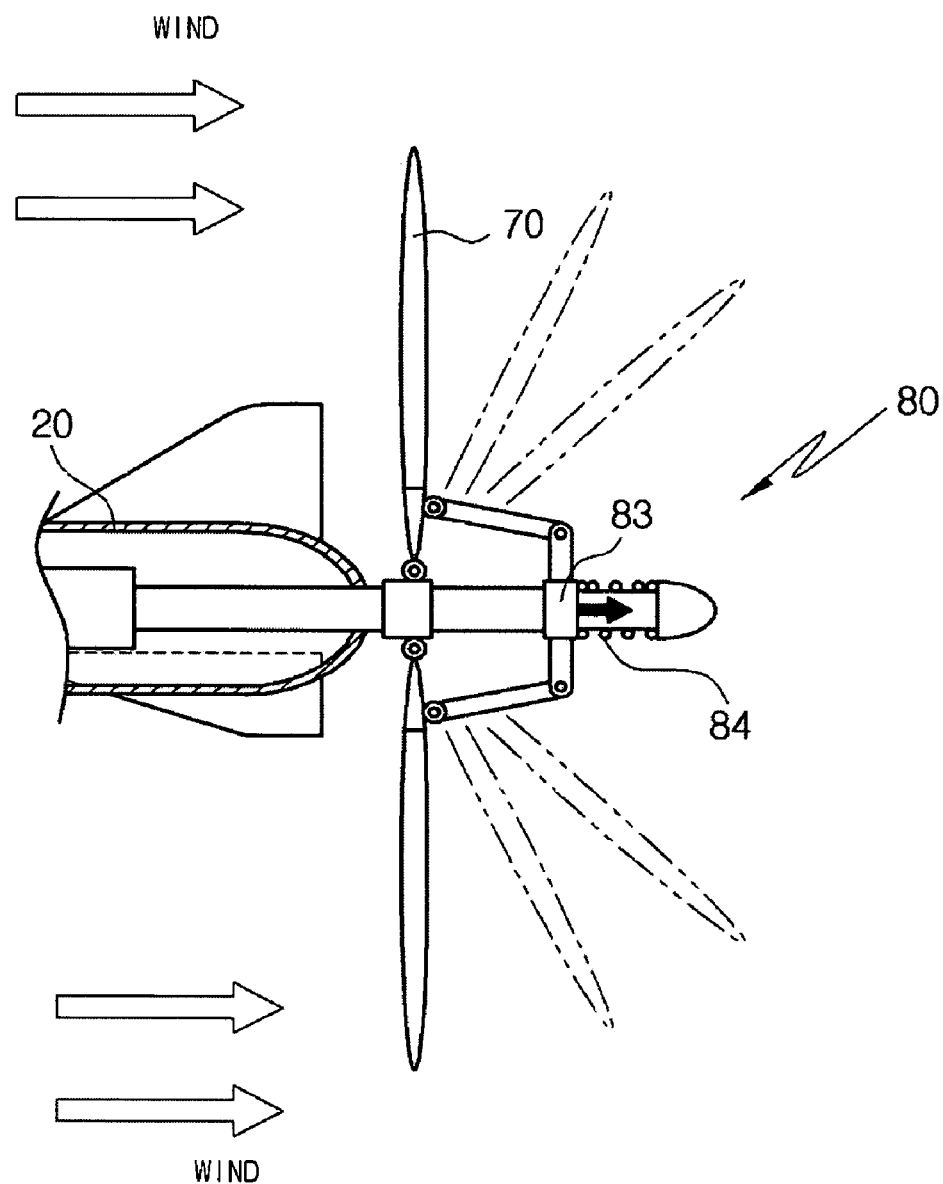
FIG. 4 illustrates cross sectional view of a wind driven power generating system according to another embodiment of the invention.

FIG. 4 illustrates a wind driven power generating system according to another embodiment of the invention.

This embodiment is identical to the previous one in terms of basic components and its operation, except that the blade variation unit 80 is associated with the blade 70 in the backside of the blade 70. That is, as shown in FIG. 4, the sliding sleeve 83 and the second link bar 85 is positioned backside the hub 81 and the blade 70 mounted thereto, and thus the spring 84 is fit around the horizontal shaft 30 between the hub 81 and a spring stopper provided at the end of the horizontal shaft 30 in order to make the blade 70 to be biased forwards against the wind.

This embodiment having the construction described above is intended to balance the whole system, depending on the size, in other words, the capacity of the wind driven power generating system of the invention. However, all the basic operations are the same as in the previous embodiment.

In some circumstances, for example, in case of a small sized wind driven power generating system, the arrangement of the blade 70 and the blade variation unit 80 of the invention as illustrated in the previous embodiment renders the center of gravity to be displaced backwards relative to the rotating center of the aerodynamic unit 20, particularly due to the blade 70 having a heavy weight. In this embodiment, therefore, in order to provide for a more stable balancing, the blade variation unit 80 is constructed backward the blade 70, so that the blade can be placed relatively near the aerodynamic unit 20, and thus the center of gravity can be moved toward the rotating center of the aerodynamic unit 20.

Consequently, more stable and cooperative balancing of the combination of the heavy blade and the aerodynamic unit can be achieved, thereby allowing for a more efficient operation of the whole system.

According to the present invention as described above, in response to a high wind pressure such as a strong wind or a sudden gust of wind, the blade variation unit is automatically operated such that the blade is variably slanted backwards and forwards to accommodate the high wind pressure without any additional pitch control. Therefore, the rotating power transmitted to the power generator can be controlled, thereby avoiding the overload of the generator, protecting the whole generating system, and also allowing for a continual generation of electricity even during a strong wind or a sudden gust of wind.

In addition, the power generator is placed in the tower and operably connected, via the vertical shaft, the bevel gears and the like, to the rotating blade mounted in the aerodynamic unit. Therefore, it allows for a convenient maintenance and an easy installation of electric wires, a stable yaw operation at a low speed of wind due to the lightness of the aerodynamic unit, and prevention of wire twisting due to the rotation of the aerodynamic unit.

Furthermore, the simplified structure of the wind driven power generating system of the invention makes it possible to reduce the manufacturing cost thereof.

Figure 5:
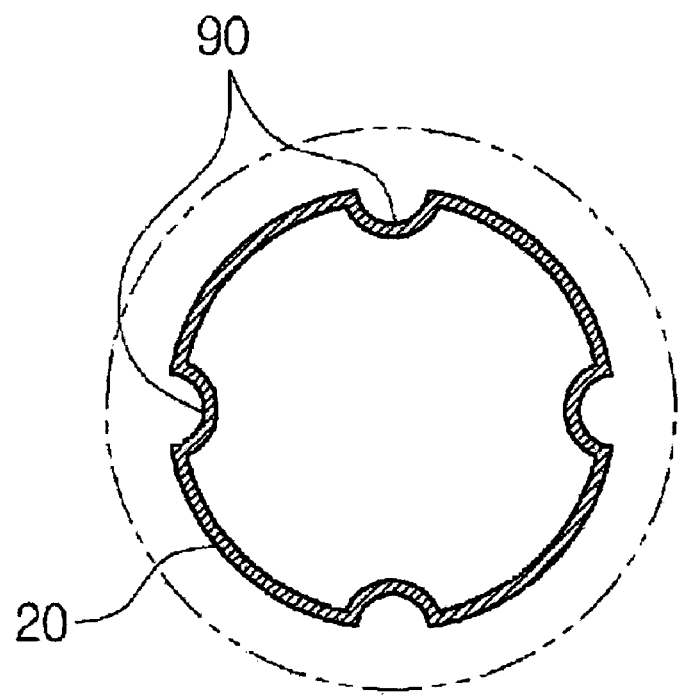
FIG. 5 is a cross sectional view taken along the line A—A in FIG. 1.

FIG. 5 illustrates another embodiment of the aerodynamic unit 20 in FIG. 1.

As shown in FIG. 1, the aerodynamic unit 20 has the shape of a bombshell having a smooth outer surface. In the embodiment of FIG. 5, however, a plurality of grooves 90 are formed on the outer peripheral surface of the aerodynamic unit 20 in the longitudinal direction thereof, i.e., along the direction in which the wind is to pass through the aerodynamic unit 20.

It is generally required in the wind driven power generators that the aerodynamic unit be readily rotated by the wind and aligned with the direction of the wind, and that the blade be smoothly rotated even by a weak wind. In this embodiment of FIG. 5, the plurality of grooves 90 can facilitate the rotation and alignment of the aerodynamic unit 20 toward the wind. Furthermore, after the alignment of the aerodynamic unit, it remains oriented to the direction of the wind due to the directional stability of the wind passing through the aerodynamic unit along the grooves 90. Also, the wind power can be effectively used for rotating the blade 90, as compared with the absence of the grooves.

Figure 6:
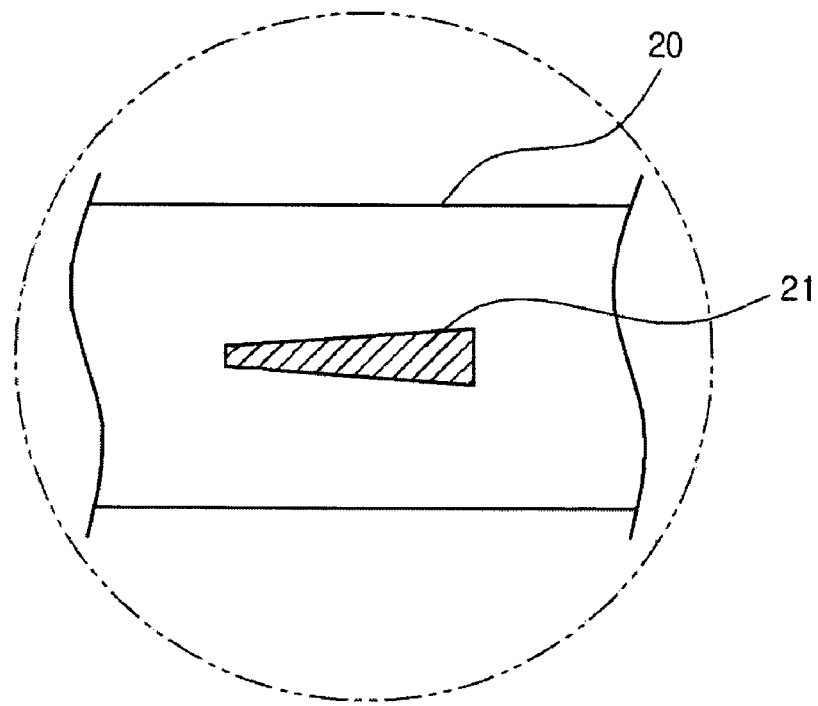
FIG. 6 illustrates another embodiment of the rudder in FIG. 1.

In this embodiment, four grooves are formed on the outer circumference of the aerodynamic unit 20 in such a manner as to be spaced at 90 degree intervals, but not limited thereto. A plurality of grooves may be formed, depending on the design of the wind driven power generating system. The grooves serves to guide the air flow thereinto FIG. 6 illustrates another embodiment of the rudder 21 in FIG. 1. As shown in FIG. 6, the rudder of this embodiment is formed in such a manner as to get thicker as it goes backwards and thinner as it goes in a radial direction. In other words, it has the form of a wedge. With the shape of the rudder in FIG. 6, therefore, the wind power and its directionality can be more effectively used in orienting the aerodynamic unit 20 toward the direction of the wind, as compared with a plate shape of rudder.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wind driven power generating system of single-rotor type in which a horizontal and vertical shafts are combined, the wind driven power generator comprising:

a) an aerodynamic unit rotatably mounted at the top of a tower having a certain height;

b) a plurality of rudders for aligning the aerodynamic unit with the direction of wind, the rudders being radially formed on the outer surface of the aerodynamic unit;

c) a horizontal shaft rotatably and horizontally mounted in the aerodynamic unit, wherein one end of the horizontal shaft is projected outwardly from a back end of the aerodynamic unit and the other end of the horizontal shaft remains inside of the aerodynamic unit and is provided with a first bevel gear;

d) a blade attached to rear end of the horizontal shaft, wherein the blade is rotated by the wind and thus rotates the horizontal shaft;

e) blade variation means disposed at rear portion of the aerodynamic unit for slanting the blade backwards and forwards, depending on the wind pressure;

f) a power generator installed inside the tower; and g) a vertical shaft for transmitting the rotating power of the horizontal shaft to the power generator, wherein one end of the vertical shaft is provided with a second bevel gear, which is engaged with the first bevel gear, and the other end thereof is connected to a rotor shaft of the power generator, wherein the blade variation means comprises;

i) a hub mounted on the horizontal shaft, the hub rotating with the horizontal shaft;

ii) a plurality of first link bars provided to the outer peripheral surface of the hub, wherein one end of each link bar is connected to the root of the blade, and the other end of each link bar is pivotably connected to the hub such that the fist link bars and the blades can be rotated about the horizontal shaft while being slanted backwards and forwards;

iii) a sliding sleeve slidably mounted on the horizontal shaft, the sliding sleeve being positioned backwards relative to the hub in such a manner as to be spaced apart from the hub;

iv) a spring fit around the horizontal shaft between the sliding sleeve and a spring stopper provided at the rear end of the horizontal shaft, for providing a restoring force; and v) a plurality of second link bars for connecting the first link bars to the sliding sleeve in such a manner that one end of each second link bars is pivotably connected to an associated one of the first link bars and the other end thereof is pivotably connected to the sliding sleeve.

2. A wind driven power generating system according to claim 1, wherein the aerodynamic unit has a plurality of grooves formed on the outer peripheral surface thereof in the longitudinal direction thereof for guiding the air flow thereinto.

3. A wind driven power generating system according to claim 1, wherein the aerodynamic unit has four grooves formed on the along the outer peripheral surface thereof in such a manner as to be spaced at 90 degree intervals.

4. A wind driven power generating system according to claim 1, wherein the rudder has the shape of a wedge, which gets thicker as it goes backwards.

* * * * *